(12) United States Patent
Alexandrou et al.

(10) Patent No.: US 8,903,969 B2
(45) Date of Patent: Dec. 2, 2014

(54) CENTRAL SERVICE CONTROL

(75) Inventors: Leon James Alexandrou, Marblehead, MA (US); Graham Baker, Londonderry, NH (US)

(73) Assignee: Microsoft Corporation, Redmond, WA (US)

( * ) Notice: Subject to any disclaimer, the term of this patent is extended or adjusted under 35 U.S.C. 154(b) by 1064 days.

(21) Appl. No.: 11/863,866

(22) Filed: Sep. 28, 2007

(65) Prior Publication Data

US 2009/0089360 A1    Apr. 2, 2009

(51) Int. Cl.
*G06F 15/173*   (2006.01)
*G06F 15/16*    (2006.01)

(52) U.S. Cl.
CPC ..................... *G06F 15/16* (2013.01)
USPC ............ 709/223; 709/224; 709/225; 709/226

(58) Field of Classification Search
USPC .......................... 709/223, 217, 224, 225, 226
See application file for complete search history.

(56) References Cited

U.S. PATENT DOCUMENTS

| | | | |
|---|---|---|---|
| 5,005,122 A * | 4/1991 | Griffin et al. ................. | 709/203 |
| 5,341,477 A | 8/1994 | Pitkin et al. ................... | 395/200 |
| 5,619,657 A | 4/1997 | Sudama et al. ........... | 395/200.06 |
| 6,098,143 A * | 8/2000 | Humpherys et al. ......... | 710/260 |
| 6,505,248 B1 * | 1/2003 | Casper et al. ................ | 709/224 |
| 6,564,216 B2 | 5/2003 | Waters ............................ | 707/10 |
| 6,574,729 B1 * | 6/2003 | Fink et al. ......................... | 713/1 |
| 6,816,964 B1 * | 11/2004 | Suzuki et al. ..................... | 713/2 |
| 6,845,392 B2 | 1/2005 | Koontz et al. ................ | 709/219 |
| 6,871,223 B2 * | 3/2005 | Drees ............................. | 709/223 |
| 6,970,913 B1 * | 11/2005 | Albert et al. .................. | 709/217 |
| 7,092,399 B1 | 8/2006 | Cheriton ........................ | 370/401 |
| 7,158,973 B2 | 1/2007 | Mandal et al. ................... | 707/10 |
| 7,233,989 B2 | 6/2007 | Srivastava et al. ............. | 709/224 |
| 7,266,822 B1 * | 9/2007 | Boudnik et al. .............. | 718/100 |
| 8,769,154 B2 * | 7/2014 | Harvey et al. ................. | 709/248 |
| 2002/0078263 A1 * | 6/2002 | Darling et al. ................ | 709/331 |
| 2002/0138665 A1 * | 9/2002 | Scheetz et al. ............... | 709/330 |
| 2002/0161839 A1 * | 10/2002 | Colasurdo et al. ............ | 709/204 |
| 2002/0178297 A1 * | 11/2002 | Lister et al. ................... | 709/310 |
| 2003/0061323 A1 * | 3/2003 | East et al. ..................... | 709/223 |

(Continued)

OTHER PUBLICATIONS

Seok-Gun Hong et al., "Design of Multiple Server Management System Using Web Services," 6 pgs., http://sslab.cheju.ac.kr/files/publication/paper28.pdf.

(Continued)

*Primary Examiner* — Jimmy H Tran
(74) *Attorney, Agent, or Firm* — Steve Crocker; Jim Ross; Micky Minhas

(57) ABSTRACT

Central service control may be provided. First, a control message from one of a plurality of framework applications may be inserted into a database. In response to the inserted control message, a trigger may be actuated in the database. In response to the trigger, the control message may be transmitted from the database and received by a plurality of redundant services. Next, from each of the plurality of redundant services in response to the received control message, the control message may be transmitted to each of a plurality of servers. From each of the plurality of servers, acknowledgements of receipt of the transmitted control message transmitted from each of the plurality of redundant services may be received. In addition, from each of the plurality of servers, status and results of an action requested by the received control message may be received.

20 Claims, 6 Drawing Sheets

(56) References Cited

U.S. PATENT DOCUMENTS

| | | |
|---|---|---|
| 2003/0140167 A1* | 7/2003 | Harvey et al. .................. 709/238 |
| 2004/0205120 A1* | 10/2004 | Dar et al. ....................... 709/203 |
| 2005/0033809 A1* | 2/2005 | McCarthy et al. ............. 709/205 |
| 2005/0120160 A1* | 6/2005 | Plouffe et al. ...................... 711/1 |
| 2005/0203939 A1* | 9/2005 | Kartzmark et al. ............ 707/102 |
| 2006/0048017 A1* | 3/2006 | Anerousis et al. ............... 714/47 |
| 2006/0095406 A1* | 5/2006 | Bestgen et al. .................... 707/3 |
| 2006/0167887 A1* | 7/2006 | Galchev .......................... 707/10 |
| 2007/0294308 A1* | 12/2007 | Megerian ....................... 707/200 |

OTHER PUBLICATIONS

K. H. Yeung el al., "Selective Broadcast Data Distribution Systems," 1995, pp. 317-324, http://ieeexplore.ieee.org/ie15/3728/10892/00500034.pdf/isNumber.

\* cited by examiner

CENTRAL SERVICE CONTROL

BACKGROUND

A server farm is a computer server collection usually maintained by an enterprise to accomplish server needs beyond any one server's capability. Often, server farms will have both a primary and a backup server allocated to a single task, so that, if the primary server fails, a backup server will take over the primary server's function. However, with multiple independent servers in a farm, there is no way to issue administrative commands to the servers in a coordinated manner. Rather the conventional strategy includes an ad hoc process where an administrator goes to each individual server in the farm in order apply commands.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Central service control may be provided. First, a control message from one of a plurality of framework applications may be inserted into a database. In response to the inserted control message, a trigger may be actuated in the database. In response to the trigger, the control message may be transmitted from the database and received by a plurality of redundant services. Next, from each of the plurality of redundant services in response to the received control message, the control message may be transmitted to each of a plurality of servers. From each of the plurality of servers, acknowledgements of receipt of the transmitted control message transmitted from each of the plurality of redundant services may be received. In addition, from each of the plurality of servers, status and results of an action requested by the received control message may be received.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
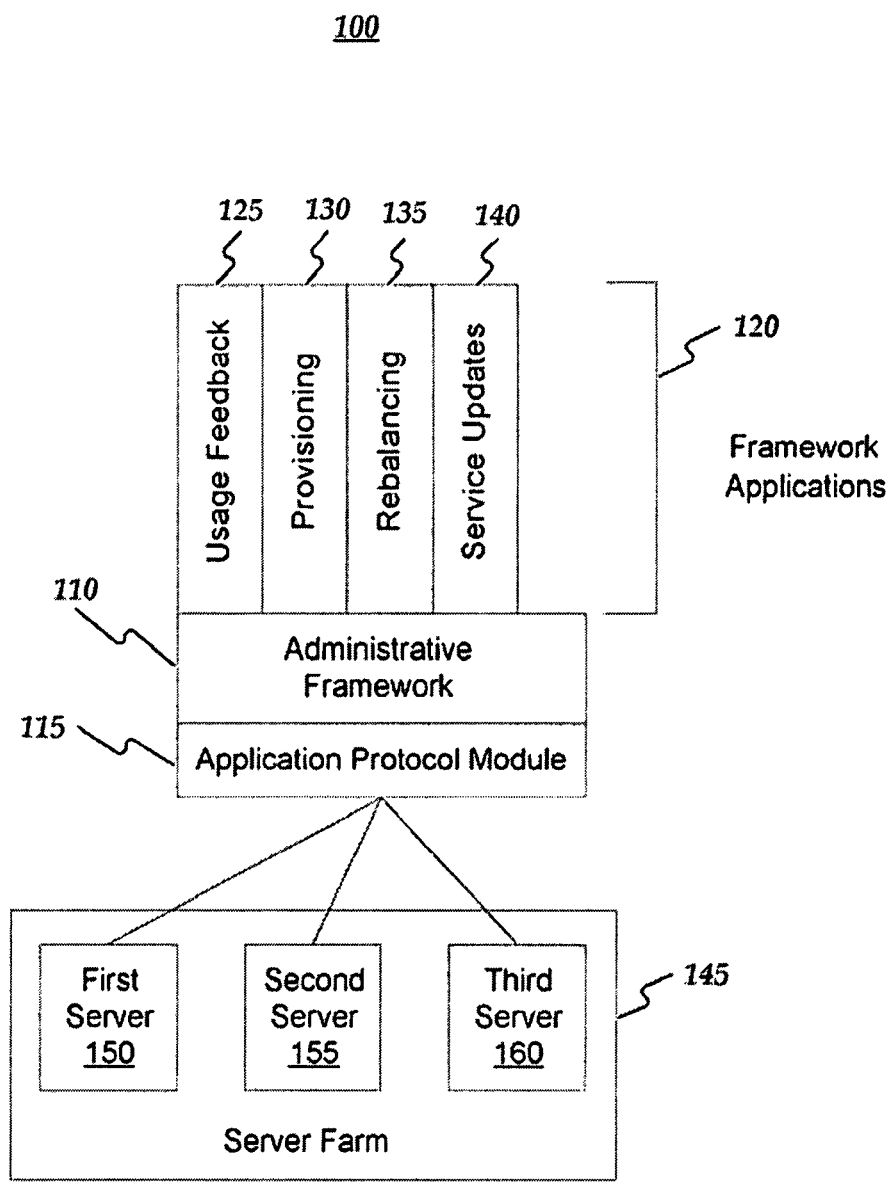
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, control protocol messages for a group of nodes (e.g. servers in a server farm) may be distributed to selected nodes over, for example, transmission control protocol (TCP) connections. Control message distribution may be initiated by inserting the control message into a database (e.g. a structured query language (SQL) database). A database trigger may be activated by the insertion that passes the control message to redundant services. The redundant services may maintain and manage bidirectional connections (e.g. using TCP) to all identified nodes. The control message may be sent to each identified node. Each node that receives the control message may acknowledge receipt of the control message. In addition, each node that receives the control message may perform a requested action in the control message asynchronously. Moreover, each node that receives the control message may asynchronously return completion status of the requested action to the originating redundant service either directly to the database or to the database through the originating redundant service. The redundant service may monitor message acknowledgements and status indications from each node, and independently manage retransmissions to enable consistent control message execution across all indicated nodes.

FIG. 1 is a block diagram of an operating environment for a central service control system 100 consistent with embodiments of the invention. As shown in FIG. 1, system 100 may include an administrative framework 110, a plurality of framework applications 120, and a server farm 145. Framework 110 may include an application protocol module 115 (e.g. using TCP.) Plurality of framework applications 120 may include, but are not limited to, a usage feedback application 125, a provisioning application 130, a rebalancing application 135, and a services update application 140. Server farm 145 may include, but is not limited to a first server 150, a second server 155, and a third server 160. For example, plurality of framework applications 120 may use administrative framework 110 to control the servers in server farm 145.

Figure 2:
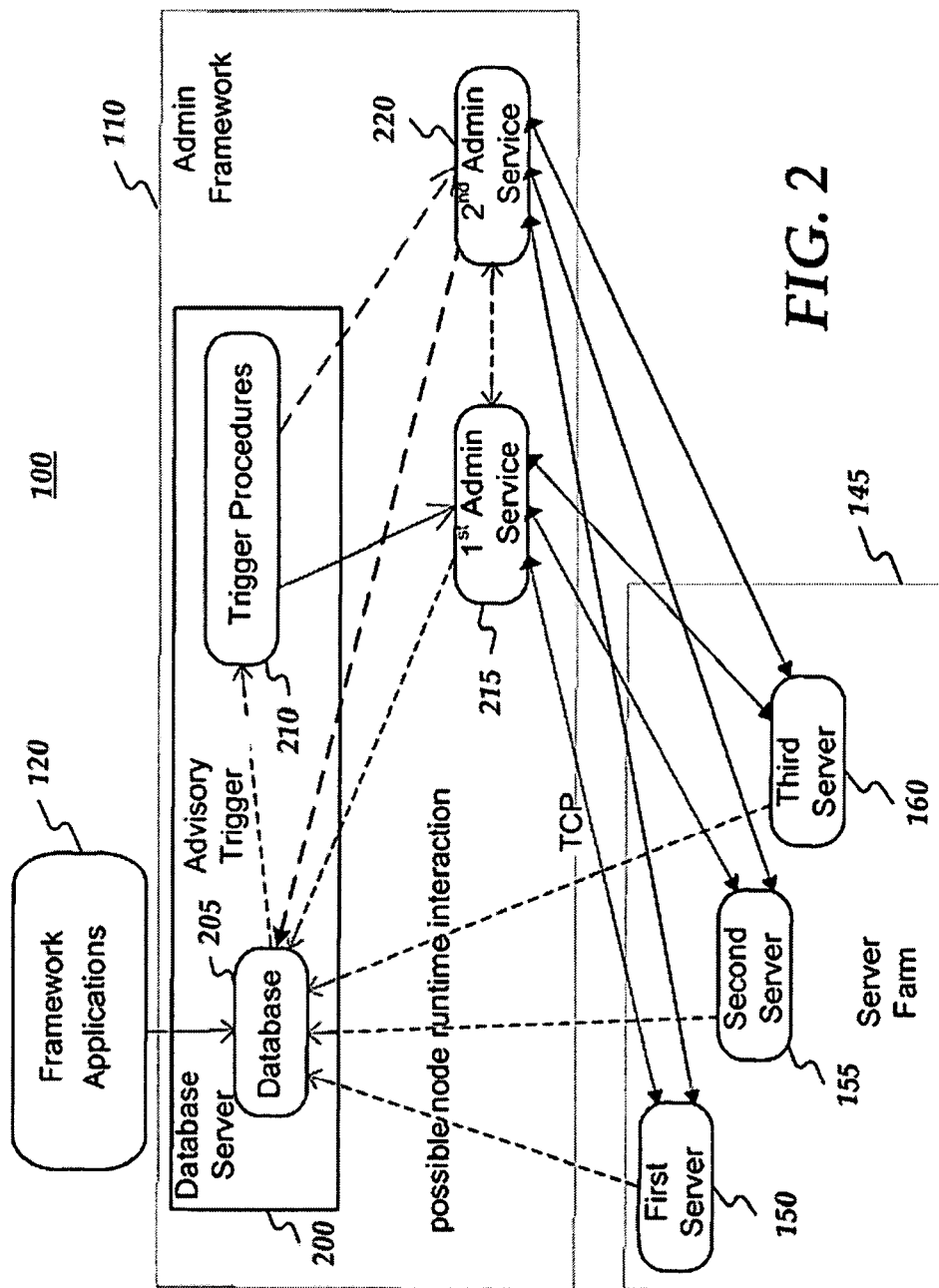
FIG. 2 is a block diagram of the operating environment of FIG. 1 in more detail.

FIG. 2 shows system 100 in more detail. As shown in FIG. 2, administrative framework 110 may include a database server 200 (e.g. a SQL server) and a plurality of redundant services. The plurality of redundant services may include, but are not limited to, a first administrative service 215 and a second administrative service 220. Database server 200 may include a database 205 and trigger procedures 210. Trigger procedures 210 may push inflow from database 205 to first administrative service 215 and to second administrative service 220. First administrative service 215 and second administrative service 220 may interact with first server 150, second server 155, and third server 160. First administrative service 215 and second administrative service 220 may then push information from first server 150, second server 155, and third server 160 back into database 205. Or first server 150, second server 155, and third server 160 may push the information back into database 205 directly. As described in more detail below with respect to FIG. 6, a computing device 600 may comprise an operating environment for administrative framework 110 consistent with embodiments of the invention. Furthermore, system 100's operation will be described below in more detail with respect to FIG. 3 consistent with embodiments of the invention.

Figure 3:
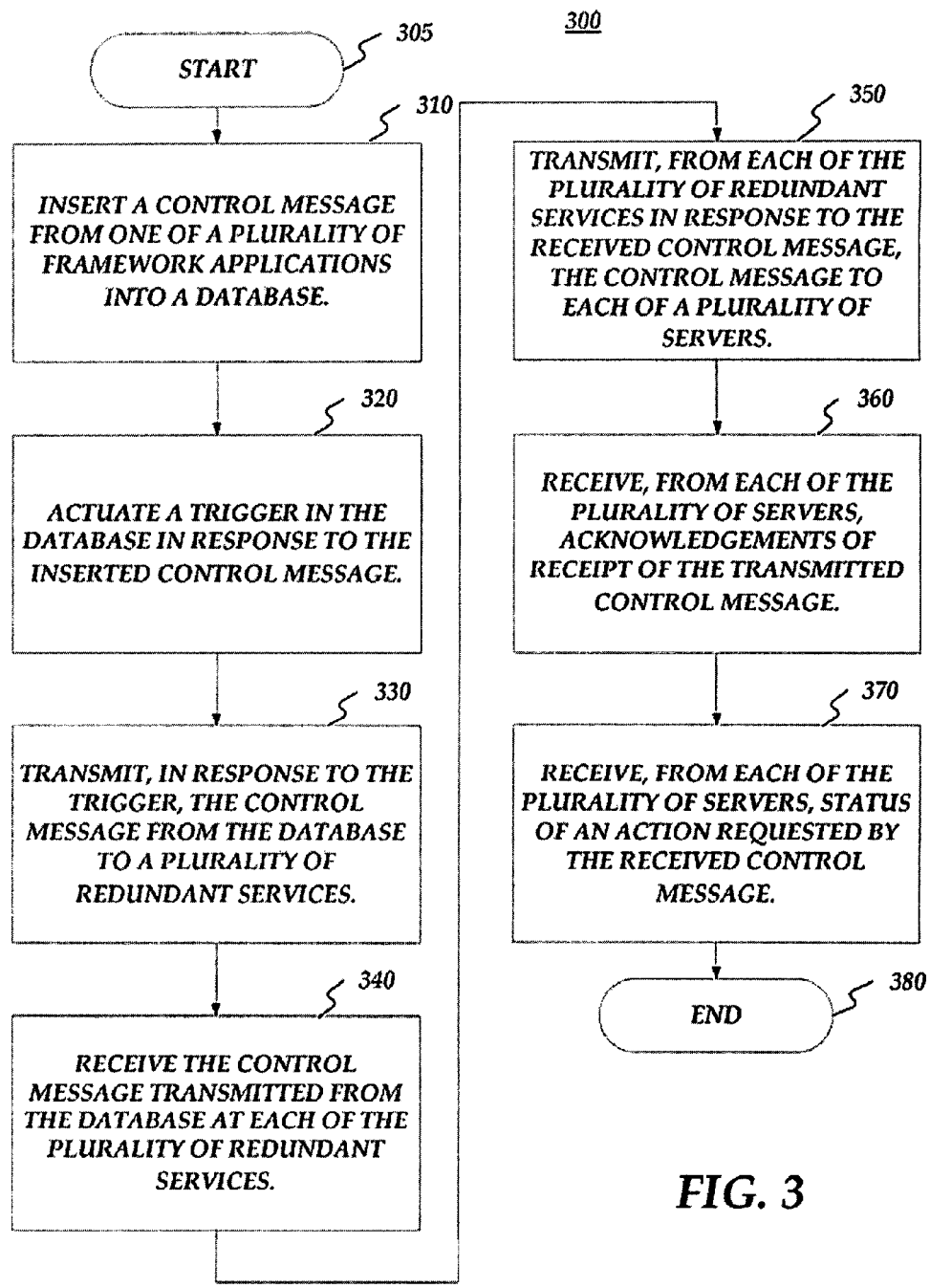
FIG. 3 is a flow chart of a method for providing central service control.

FIG. 3 is a flow chart setting forth the general stages involved in a method 300 consistent with embodiments of the invention for providing central service control. Method 300 may be implemented using computing device 600 as described in more detail below with respect to FIG. 6. For example, administrative framework 110 may be implemented using computing device 600. Ways to implement the stages of method 300 will be described in greater detail below.

Method 300 may begin at starting block 305 and proceed to stage 310 where framework 110 may insert a control message from one of a plurality of framework applications (e.g. usage feedback application 125, provisioning application 130, rebalancing application 135, services update application 140, etc.) into database 205. For example, provisioning application 130 may receive usage feedback indicating trends relative to server farm 145's capacity and loading. Some servers in server farm 145 may be running in the red, the yellow, or the green capacity wise. Based on various parameters, an algorithm in provision application 130 may trend various metrics and aggregate them into a grade for each server in server farm 145. Based on the aforementioned grades, provision application 130 may push certain control messages into database 105. The certain control messages pushed into database 105 may be directed to balancing the load on server farm 145 between first server 150, second server 155, and third server 160.

From stage 310, where framework 110 inserts the control message, method 300 may advance to stage 320 where framework 110 may actuate a trigger in database 205 in response to the inserted control message. For example, in response to the inserted control message in database 205, triggering procedures 210 in database server 200 may be actuated in response to the inserted control message. When database 205 comprises a SQL database, the triggering procedures may comprise CLR triggering procedures.

Once framework 110 actuates the trigger in stage 320, method 300 may continue to stage 330 where framework 110 may transmit, in response to the trigger, the control message from database 205 to a plurality of redundant services (e.g. first administrative service 215 and second administrative service 220.) For example, triggering procedures 210 may transmit the control message to one or both of first administrative service 215 and second administrative service 220.

After framework 110 transmits the control message in stage 330, method 300 may proceed to stage 340 where the plurality of redundant services may receive the control message transmitted from database 205. For example, first administrative service 215 and second administrative service 220 may each independently back to database 205 as independent autonomous peers.

From stage 340, where first administrative service 215 and second administrative service 220 receive the control message, method 300 may advance to stage 350 where framework 110 may transmit, from each of the plurality of redundant services in response to the received control message, the control message to server farm 145 (e.g. first server 150, second server 155, and third server 160.) For example, framework 110 may use application protocol module 115 to communicate with server farm 145. Over persistent TCP channels, for example, command message information may flow down from framework 110 and status information may flow back from server farm 145. A multi-state registration process for establishing this communication and a secure connection establishing process are described in more detail below with respect to FIG. 4 and FIG. 5 respectively.

Once framework 110 transmits the control message in stage 350, method 300 may continue to stage 360 where framework 110 may receive, from first server 150, second server 155, and third server 160, acknowledgements of receipt of the transmitted control message transmitted from first administrative service 215 and second administrative service 220. After framework 110 receives the acknowledgements of receipt in stage 360, method 300 may proceed to stage 370 where framework 110 may receive, from each of the plurality of servers, status of an action requested by the received control message. For example, acknowledgements or status may be sent from the servers in server farm 145 directly to database 205. Or, consistent with other embodiments of the invention, acknowledgements or status may be sent from the servers in server farm 145 to first administrative service 215 and second administrative service 220. Then first administrative service 215 and second administrative service 220 may, in turn, send acknowledgements or status to database 205. Once framework 110 receives status of the action in stage 370, method 300 may then end at stage 380.

Figure 4:
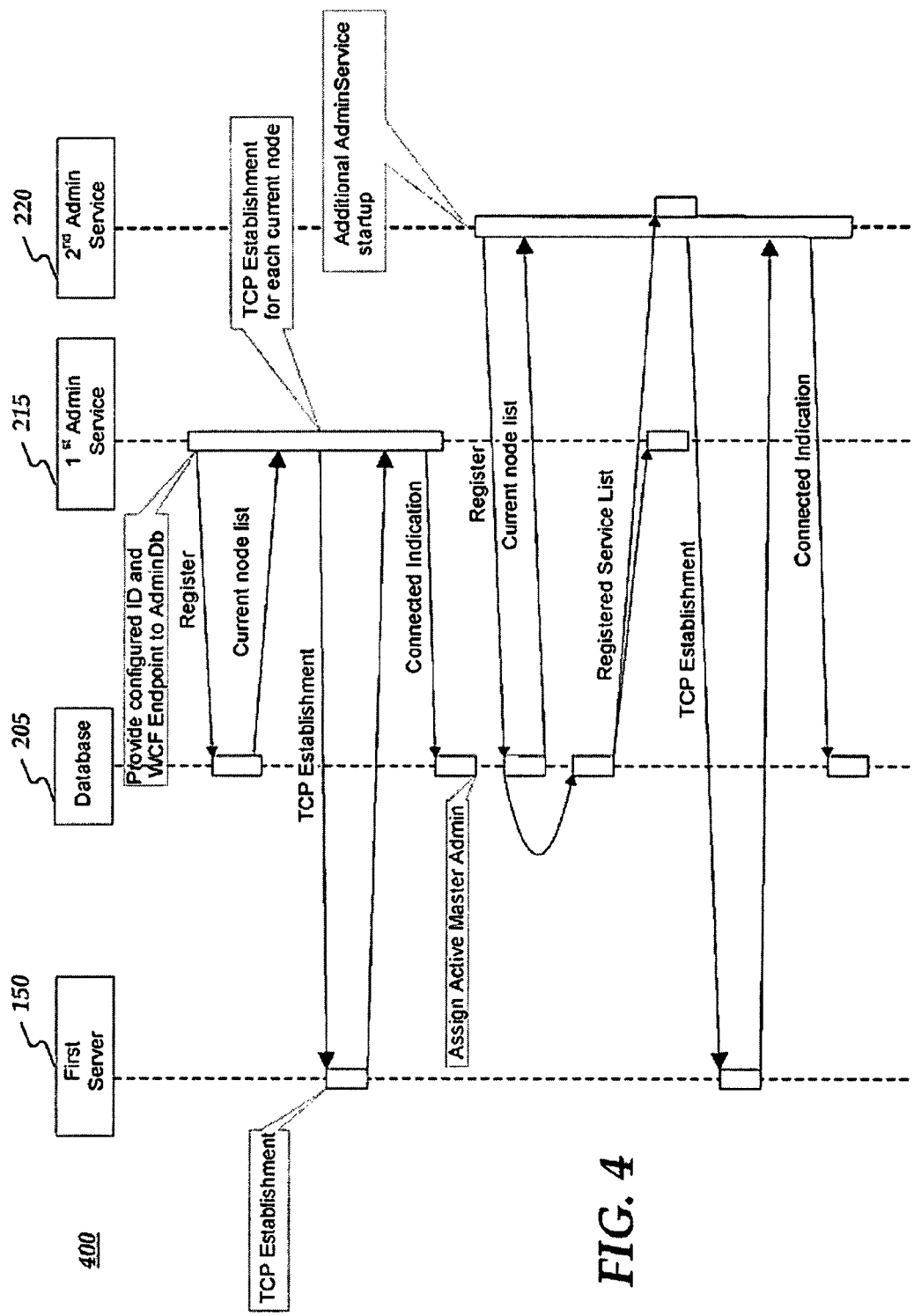
FIG. 4 is a state diagram of a multi-state registration process.

FIG. 4 is a state diagram of a multi-state registration process consistent with embodiments of the invention. First, when each of first administrative service 215 and second administrative service 220 is turned on, they may register with database 205 so that database 205 knows which of these services is up and running. Database 205 may include a list of what servers framework 110 should be controlling. First administrative service 215 may then connect, for example, through a persistent TCP connections to each of the servers in server farm 145. FIG. 4 shows what may be involved when first administrative service 215 comes online and when second administrative service 220 (e.g. a secondary backup or redundant service) comes online. For example, FIG. 4 shows how second administrative service 220 may also establish connections to all of the servers in server farm 145.

Figure 5:
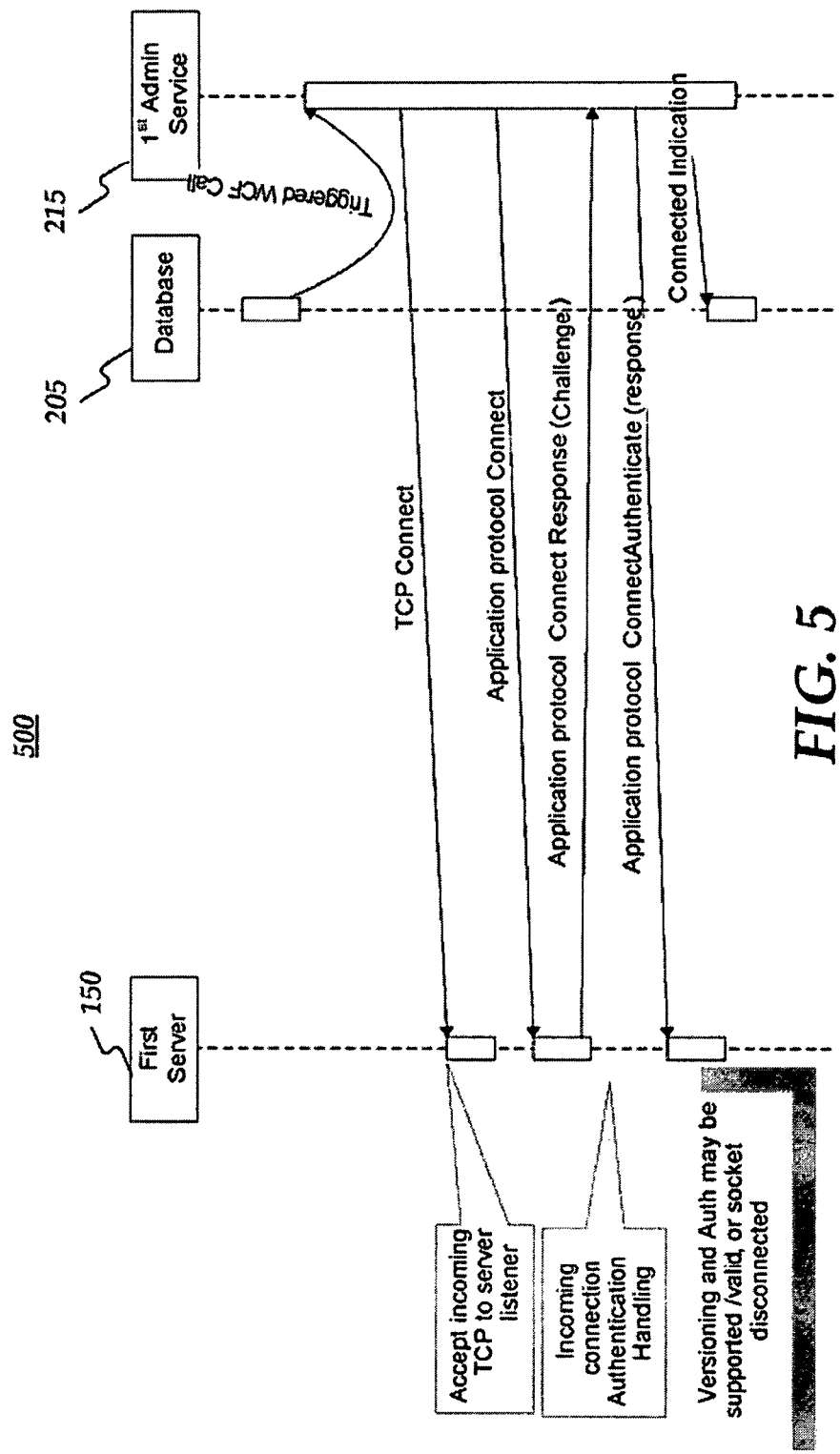
FIG. 5 is a state diagram of a secure connection establishing process.

FIG. 5 is a state diagram of a secure connection establishing process. As shown in FIG. 5, a secure connection may be established between first administrative service 115 and first server 150 in server farm 145. This established connection may not be an open insecure connection. Rather administrative framework 110 may establish a connection and maintain an application protocol security verification over the connection before accepting or indicating that communications can be made over the connection between administrative service 115 and first server 150. For example, in FIG. 5, the connection between first administrative service 215 (or second administrative service 220) and each one of the servers in server farm 145 may first be authenticated. Consequently, both ends of the connection may know who they are talking to and that it is over a secure path.

An embodiment consistent with the invention may comprise a system for providing central service control. The system may comprise a memory storage and a processing unit coupled to the memory storage. The processing unit may be operative to insert a control message from one of a plurality of framework applications into a database and to actuate a trigger in the database in response to the inserted control message. In addition, the processing unit may be operative to transmit, in response to the trigger, the control message from the database to a plurality of redundant services and to receive the control message transmitted from the database at each of the plurality of redundant services. Moreover, the processing unit may be operative to transmit, from each of the plurality of redundant services in response to the received control message, the control message to each of a plurality of servers. In addition, the processing unit may be operative to receive, from each of the plurality of servers, acknowledgements of receipt of the transmitted control message transmitted from each of the plurality of redundant services and to receive, from each of the plurality of servers, status of an action requested by the received control message.

Another embodiment consistent with the invention may comprise a system for providing central service control. The system may comprise a memory storage and a processing unit coupled to the memory storage. The processing unit may be operative to insert a control message from one of a plurality of framework applications into a database and to actuate a trigger in the database in response to the inserted control message. Moreover, the processing unit may be operative to transmit, in response to the trigger, the control message from the database to a plurality of redundant services and to receive the control message transmitted from the database at each of the plurality of redundant services. Furthermore, the processing unit may be operative to transmit, from each of the plurality of redundant services in response to the received control message, the control message to each of a plurality of servers. In addition, the processing unit may be operative to monitor, by each of the plurality of redundant services, control message acknowledgements and status indications from each of the plurality of servers and to manage control message retransmissions to ensure consistent control message execution across each of the plurality of servers.

Yet another embodiment consistent with the invention may comprise a system for providing central service control. The system may comprise a memory storage and a processing unit coupled to the memory storage. The processing unit may be operative to insert a control message from one of a plurality of framework applications into a database comprising a structured query language (SQL) database. The plurality of framework applications may comprise a usage feedback application, a provisioning application, a rebalancing application, or a service updates application. In addition, the processing unit may be operative to actuate a trigger in the database in response to the inserted control message and to transmit, in response to the trigger, the control message from the database to a plurality of redundant services. Moreover, the processing unit may be operative to receive the control message transmitted from the database at each of the plurality of redundant services and to transmit, from the each of the plurality of redundant services in response to the received control message, the control message to each of a plurality of servers. Moreover, the processing unit may be operative to receive, from each of the plurality of servers, acknowledgements of receipt of the transmitted control message transmitted from each of the plurality of redundant services asynchronously and to receive, from each of the plurality of servers, status of an action requested by the received control message asynchronously.

Figure 6:
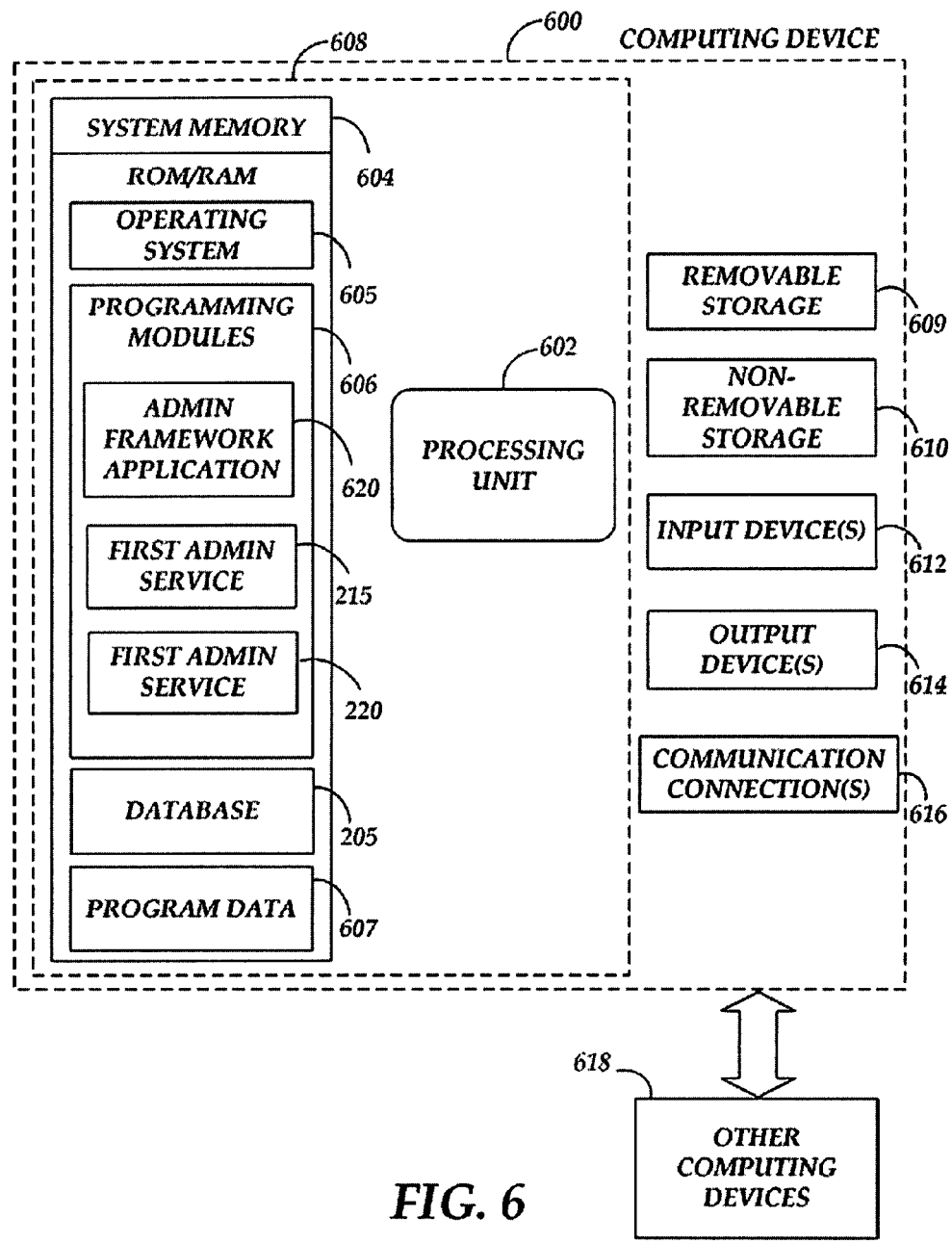
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for administrative framework 110 as described above. Administrative framework 110 may operate in other environments and is not limited to computing device 600.

With reference to FIG. 6, a system consistent with embodiments of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607 and database 205 as described above. Operating system 605, for example, may be suitable for controlling computing device 600's operation. In one embodiment, programming modules 606 may include, for example, an administrative framework application 620, first administrative service 215, and second administrative service 220. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Other computing devices 618 may comprise, but are not limited to, the servers in server farm 145. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g. administrative framework application 620) may perform processes including, for example, one or more method 300's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing central service control, the method comprising:
receiving usage feedback indicating trends relative to a server farm's capacity and loading, wherein the server farm comprises a plurality of servers;
compiling the trends relative to the server farm's capacity and loading into a plurality of metrics;
aggregating the metrics into a grade for each server in the server farm, the grade for each server corresponding to a capacity and a load for each server;

inserting a control message from one of a plurality of framework applications into a database, the control message being directed to balancing a load on at least one of the plurality of servers in the server farm based on the grade for the at least one server in the server farm;

actuating a trigger in the database in response to the inserted control message;

registering a plurality of redundant services with the database, wherein registering the plurality of redundant services comprises notifying the database that each of the plurality of redundant services is turned on;

transmitting, in response to the trigger, the control message from the database to each of the registered plurality of redundant services;

receiving the control message transmitted from the database at each of the registered plurality of redundant services;

transmitting, from each of the registered plurality of redundant services in response to the received control message, the control message to each of the registered plurality of servers;

receiving, from each of the registered plurality of servers, acknowledgements of receipt of the transmitted control message transmitted from each of the registered plurality of redundant services; and receiving, from each of the registered plurality of servers, status and results of an action requested by the received control message.

2. The method of claim 1, wherein inserting the control message from the one of the plurality of framework applications into the database comprises inserting the control message into the database comprising a structured query language (SQL) database.

3. The method of claim 1, wherein inserting the control message from the one of the plurality of framework applications into the database comprises inserting the control message from the one of the plurality of framework applications comprising one of the following applications: usage feedback, provisioning, rebalancing, and service updates.

4. The method of claim 1, wherein receiving, from each of the plurality of servers, the acknowledgements of receipt of the transmitted control message transmitted from each of the plurality of redundant services comprises receiving the acknowledgements from each of the plurality of servers asynchronously.

5. The method of claim 1, wherein receiving, from each of the plurality of servers, the status of the action requested by the received control message comprises receiving the status of the action requested by the received control message from each of the plurality of servers asynchronously.

6. The method of claim 1, wherein receiving, from each of the plurality of servers, the acknowledgements of receipt of the transmitted control message transmitted from each of the plurality of redundant services comprises receiving the acknowledgements from each of the plurality of servers at at least one of the following: each of the plurality of redundant services and the database.

7. The method of claim 1, wherein receiving, from each of the plurality of servers, the status of the action requested by the received control message comprises receiving the status of the action requested by the received control message from each of the plurality of servers at at least one of the following: each of the plurality of redundant services and the database.

8. The method of claim 1, wherein receiving, from each of the plurality of servers, the acknowledgements of receipt of the transmitted control message transmitted from the each of the plurality of redundant services comprises receiving the acknowledgements from each of the plurality of servers at the each of the plurality of redundant services wherein each of the plurality of redundant services passes the acknowledgements to the database.

9. The method of claim 1, wherein receiving, from each of the plurality of servers, the status and results of the action requested by the received control message comprises receiving the status of the action requested by the received control message from each of the plurality of servers at each of the plurality of redundant services wherein each of the plurality of redundant services passes the status and results to the database.

10. The method of claim 1, wherein transmitting, from each of the plurality of redundant services in response to the received control message, the control message to each of the plurality of servers comprises transmitting the control message to each of the plurality of servers being disposed in the server farm.

11. The method of claim 1, wherein transmitting, from each of the plurality of redundant services in response to the received control message, the control message to each of the plurality of servers comprises transmitting the control message to each of the plurality of servers wherein each of the plurality of redundant services maintains and manages bidirectional connections to each of the plurality of servers.

12. The method of claim 1, wherein transmitting, from each of the plurality of redundant services in response to the received control message, the control message to each of the plurality of servers comprises transmitting the control message to each of the plurality of servers wherein each of the plurality of redundant services maintains and manages bidirectional connections to each of the plurality of servers wherein the bidirectional connections use transmission control protocol (TCP).

13. The method of claim 1, wherein transmitting, from each of the plurality of redundant services in response to the received control message, the control message to each of the plurality of servers comprises transmitting the control message to each of the plurality of servers wherein the control message identifies each of the plurality of servers.

14. The method of claim 1, further comprising performing, by each of the plurality of servers, the action requested by the control message.

15. The method of claim 1, further comprising performing, by each of the plurality of servers, the action requested by the control message wherein each of the plurality of servers performs the action asynchronously.

16. A computer-readable storage device which stores a set of instructions which when executed performs a method for providing central service control, the method executed by the set of instructions comprising:

inserting a control message from one of a plurality of framework applications into a database, wherein inserting the control message from one of the plurality of framework applications into the database comprises inserting the control message by a provision application configured to:

gather usage feedback indicating trends relative to a server farm's capacity and loading, wherein the server farm comprises a plurality of servers;

compiling the trends into a plurality of metrics;

gather at least one metric for each of the plurality of servers, the metrics corresponding to a load and a capacity for each of the plurality of servers, grade each server of the plurality of servers based on the metrics, and insert the control message to direct balancing a load on at least one of the plurality of servers based on a grade for the at least one server, the load balancing being directed based on the metrics associated with the load and the capacity for the at least one server;

actuating a trigger in the database in response to the inserted control message;

registering a plurality of redundant services with the database, wherein registering the plurality of redundant services comprises notifying the database that each of the plurality of redundant services is turned on;

transmitting, in response to the trigger, the control message from the database to the plurality of redundant services;

receiving the control message transmitted from the database at each of the plurality of redundant services;

transmitting, from each of the plurality of redundant services in response to the received control message, the control message to each of the plurality of servers;

monitoring, by each of the plurality of redundant services, control message acknowledgements and status indications from each of the plurality of servers; and managing control message retransmissions to ensure consistent control message execution across each of the plurality of servers.

17. The computer-readable storage device of claim 16, wherein inserting the control message from the one of the plurality of framework applications into the database comprises inserting the control message into the database comprising a structured query language (SQL) database.

18. The computer-readable storage device of claim 16, wherein inserting the control message from the one of the plurality of framework applications into the database comprises inserting the control message from the one of the plurality of framework applications comprising one of the following applications: usage feedback, provisioning, rebalancing, and service updates.

19. A system for providing central service control, the system comprising:

a memory storage; and a processing unit coupled to the memory storage, wherein the processing unit is operative to:

insert a control message from a provision application into a database comprising a structured query language (SQL) database, wherein the provision application is configured to:

gather usage feedback indicating trends relative to a server farm's capacity and loading, wherein the server farm comprises a plurality of servers;

compiling the trends into a plurality of metrics;

gather at least one metric for each of the plurality of servers, the at least one metric indicating a capacity of each of the plurality of servers, grade each one of the plurality of servers based on the at least one metric, the grade corresponding to at least one of the following: a red server state, a yellow server state, and a green server state, the grade corresponding to a capacity of each one of the plurality of servers, and provide the control message directed to balancing a load on at least one of the plurality of servers based on the grade of the at least one of the plurality of servers;

actuate a trigger in the database in response to the inserted control message;

register a plurality of redundant services with the database, wherein registering the plurality of redundant services comprises notifying the database that each of the plurality of redundant services is turned on;

transmit, in response to the trigger, the control message from the database to a plurality of redundant services;

receive the control message transmitted from the database at each of the plurality of redundant services;

transmit, from the each of the plurality of redundant services in response to the received control message, the control message to each of the plurality of servers;

monitor for control message acknowledgements and status indications from each of the plurality of servers;

receive, from each of the plurality of servers, acknowledgements of receipt of the transmitted control message transmitted from each of the plurality of redundant services asynchronously; and receive, from each of the plurality of servers, status of an action and results requested by the received control message asynchronously.

20. The system of claim 19, wherein the processing unit is further operative to perform, by each of the plurality of servers that received the control message, the action requested by the control message wherein each of the plurality of servers performs the action asynchronously.

\* \* \* \* \*